(12) United States Patent  
Takeda

(10) Patent No.: US 6,517,448 B1
(45) Date of Patent: Feb. 11, 2003

(54) GOLF CLUB AND METHOD FOR MANUFACTURING THE SAME

(75) Inventor: Hitoshi Takeda, Tsubame (JP)

(73) Assignee: K.K. Endo Seisakusho, Niigata-ken (JP)

(*) Notice: Subject to any disclaimer, the term of this patent is extended or adjusted under 35 U.S.C. 154(b) by 0 days.

(21) Appl. No.: 09/538,191

(22) Filed: Mar. 30, 2000

(30) Foreign Application Priority Data

Dec. 28, 1999 (JP) ............................................. 11-375426
Mar. 30, 2000 (JP) ........................................ 2000-094901

(51) Int. Cl.[7] .................... A63B 53/04; A63B 53/06; A63B 53/00; A63B 53/08
(52) U.S. Cl. ........................ 473/324; 473/349; 473/291
(58) Field of Search ................................. 473/359, 349, 473/342, 324, 290, 291, 345, 334, 350; 148/219, 121.63, 121.64; 29/228

(56) References Cited

U.S. PATENT DOCUMENTS 5,536,011 A * 7/1996 Gutowski .................... 473/350
5,658,209 A * 8/1997 Blakemore .................. 473/350
5,688,187 A * 11/1997 Duncan ....................... 473/305
6,099,414 A * 8/2000 Kusano et al. .............. 473/342
6,220,971 B1 * 4/2001 Takeda ........................ 473/342

FOREIGN PATENT DOCUMENTS

JP      8-280856      10/1996
JP      2000-116822   4/2000

* cited by examiner

Primary Examiner—Paul T. Sewell
Assistant Examiner—Sneh Varma
(74) Attorney, Agent, or Firm—Quarles & Brady LLP

(57) ABSTRACT

A golf club with an enhanced degree of freedom with respect to design, and a method for manufacturing the same. A head 1 is formed with a face 3 on a front face, a cavity 9 on a rear face and a shaft attachment portion 8 on one side, to which is connected a shaft 2. If a maximum height of a bottom surface 9A of the cavity 9 in the top-to-sole direction is denoted by H1, and a maximum width thereof in the toe-to-heel direction is denoted by W1, the cavity 9 is formed to satisfy an inequality: $H1/W1 \geq 0.6$. Further, if a maximum height of the face 3 is denoted by H2, then the cavity 9 is formed to satisfy an inequality: $0.7 \leq H1/H2 \leq 0.85$. Thus, the face 3 can be easily resiliently bent at the time of striking balls, thereby developing a greater repulsive force, elongating travelling distances of balls.

5 Claims, 16 Drawing Sheets

GOLF CLUB AND METHOD FOR MANUFACTURING THE SAME

BACKGROUND OF THE INVENTION a) Field of the Invention

The present invention relates to a golf club and a method for manufacturing the same.

b) Prior Art

As disclosed in Japanese Registered Patent Publication No.2560272, it is known art to provide an iron golf club which comprises a face member, a head body having an aperture on a front surface for securing the face member thereto, a cavity on a rear surface and a shaft attachment portion on one side; and a shaft connected thereto.

Recently, the main currents of iron golf clubs have been directed to the use of a cavity-back type head. The cavity-back configuration is aimed at enlarging a moment of inertia by concaving a middle portion of a rear face of a head so as to distribute the weight toward a periphery thereof, thus decreasing the deviation of travelling directions of balls caused by so-called off-center shots. According to conventional golf clubs, club heads are relatively long in the toe-to-heel direction, and thus, cavities thereof eventually become too long in the same direction, so that there is a problem that it is difficult to obtain a great repulsive force by resiliently bending a face of the head.

Further, an improved cavity-back type head with an undercut configuration is also known art. Such undercut configuration is aimed at making the center of gravity deeper by further hollowing a cavity toward the sole direction, which also contributes to enlarging a resiliently bending area on a face, improving a repulsive force against balls.

For methods of manufacturing a head with such undercut configuration, an insert die method wherein an insert die is used as a partial die for a cavity forming portion, a machining method wherein a golf club with a face on a front surface and a cavity on a rear surface is produced by machining, said cavity being machined from a rear side to form the undercut configuration.

According to conventional methods, however, there are limitations to the depth and configuration to be hollowed. Namely, according to the insert die method, the insert die must be removed after forming, but too deep undercut disenables the removal of the insert die. Further, according to the machining method in which machining is performed from a rear surface of a head, machining tools such drills often do not reach the depth of a cavity and is likely to damage other portions. In other words, according to these conventional methods, the undercut configuration is not free to form, thus leading to the restricted degree of freedom relative to the positional setting of the center of gravity of a head, making it difficult to insure an effective configuration and area on a face which is to be resiliently bent.

In the meantime, for the above-mentioned iron golf club comprising a face member; a head body having an aperture on a front surface for securing the face member thereto, a cavity on a rear surface and a shaft attachment portion on one side; and a shaft connected thereto, is used welding, specifically laser beam welding as a means for securing the face member to the aperture, as laser beam welding is advantageous in directional maneuverability.

However, when components are welded to each other with one component being flush with the other, the middle portion of the welded portion rises while both ends thereof sink due to being attracted by heat. Further, as laser beam welding realizes such rapid heating and rapid cooling that bubbles generated inside the welded portion are confined within the same before they come out to the external, so that pin holes appear on the surface when polishing a club head at a later stage. Such problems occur noticeably in the case of partial welding in which penetration does not reach a rear surface.

SUMMARY OF THE INVENTION

Accordingly, it is a main object of the present invention to provide a golf club with a larger degree of freedom in designing the same so that a face may be easily bent resiliently and a head may have a lowered center of gravity.

It is another object of the invention to provide a method for manufacturing a golf club with such larger degree of freedom.

It is a further object of the invention to provide a method for manufacturing a golf club which can protect a golf club against sinks and/or pin holes generated when performing laser beam welding.

To attain the above objects, there is provided, in accordance with from a first aspect of the invention, a golf club which comprises: a head which has a face on a front surface, a shaft attachment portion at one side and a cavity on a rear surface, said cavity having a bottom surface defined by a maximum length $H1$ in a top-to-sole direction and another maximum length $W1$ in a toe-to-heel direction; and a shaft connected to the head, wherein the cavity is formed to satisfy an inequality: $H1/W1 \geq 0.6$.

Further, from a second aspect of the invention, there is provided a golf club which comprises: a head which has a face on a front surface, said face having a maximum length $H2$ in a top-to-sole direction, a shaft attachment portion at one side and a cavity on a rear surface, said cavity having a bottom surface defined by a maximum length $H1$ in a top-to-sole direction; and a shaft connected to the head, wherein the cavity is formed to satisfy an inequality: $0.7 \leq H1/H2 \leq 0.85$.

With above-structured golf club, there can be provided a golf club with a larger degree of freedom in designing the same so that a face may be easily bent resiliently to give a greater repulsive force against balls.

According to another aspect of the invention, there is provided a method for manufacturing a golf club, said golf club comprising: a head having a face on a front surface and a shaft attachment portion at one side, said head being formed by combining a plurality of members; and a shaft connected to the head, said method comprising the steps of: forming a beveled portion on a rear surface of one of said combining members; and then joining the members together by welding. Accordingly, a relief space for bubbles generated during the laser beam welding is insured, said bubbles being able to escape through the relief space by means of the penetration welding relative to the partially thinned portion.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF PREFERRED EMBODIMENTS

Hereinafter are described embodiments of the present invention with reference to the attached drawings.

Figure 1:
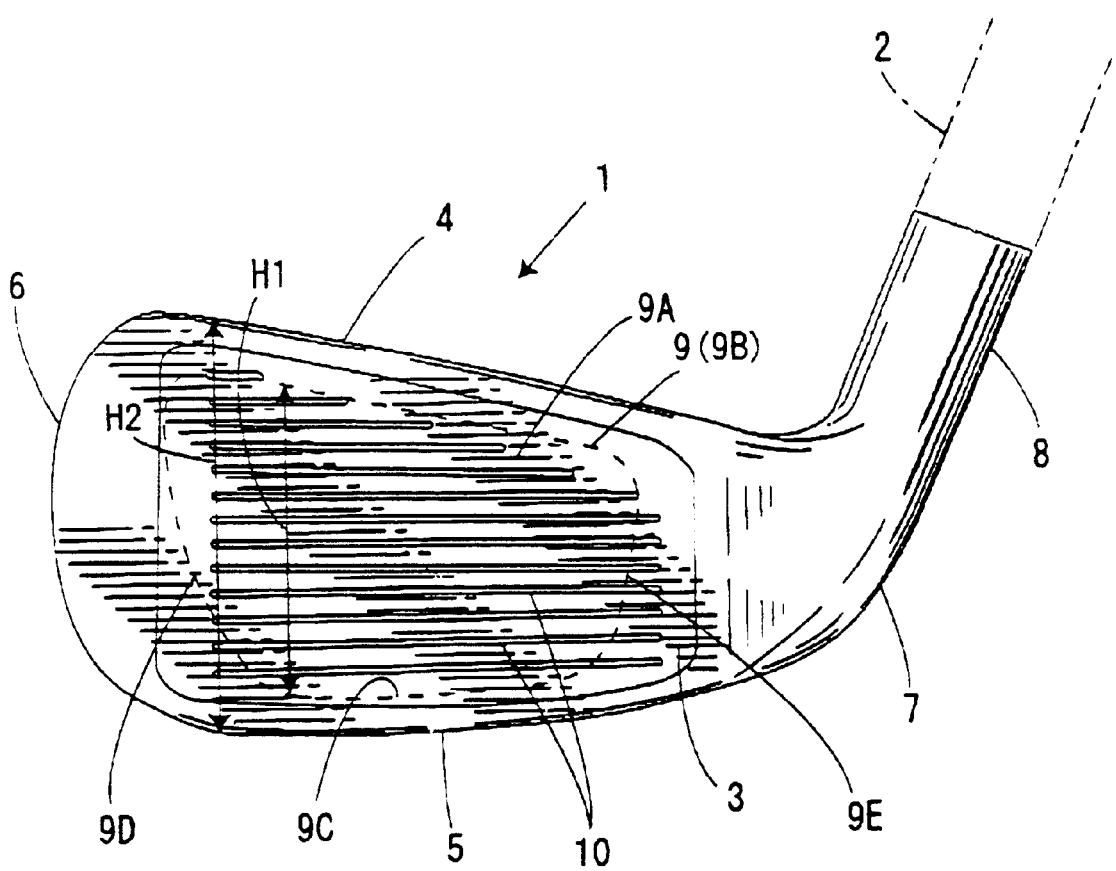
FIG. 1 is a front view showing a first embodiment of the invention.
Figure 2:
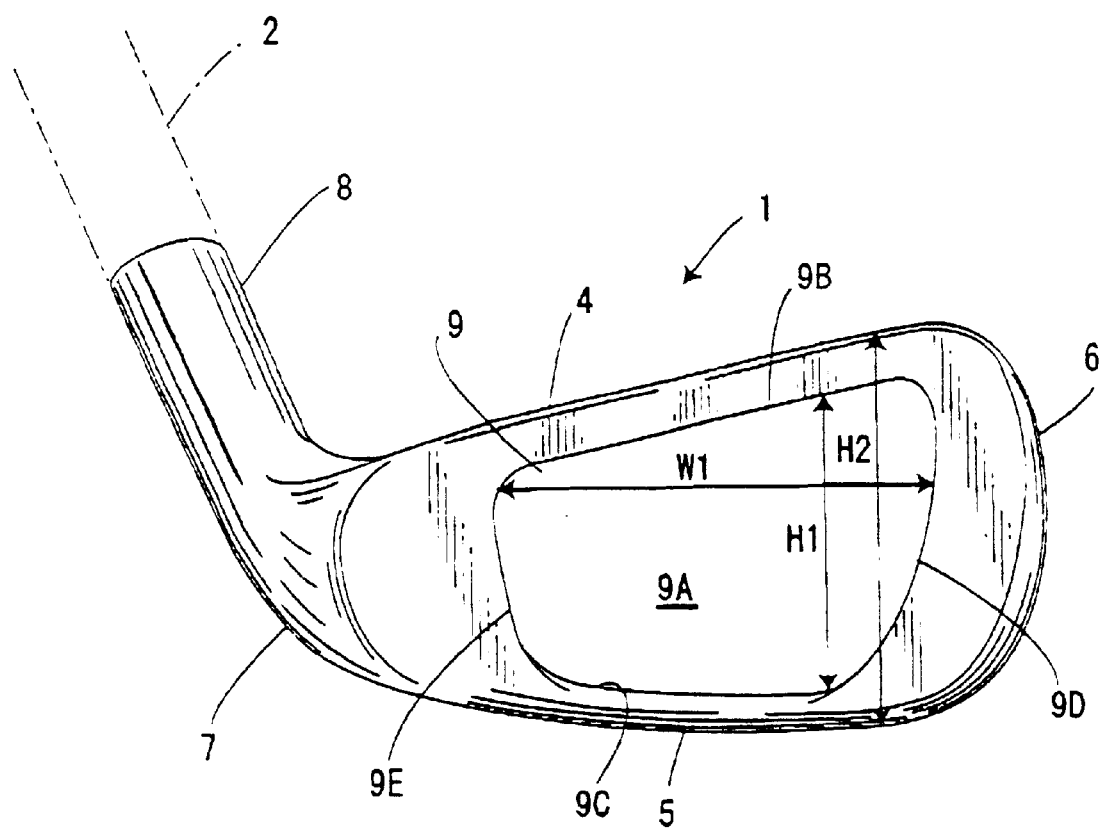
FIG. 2 is a rear view showing a first embodiment of the invention.
Figure 3:
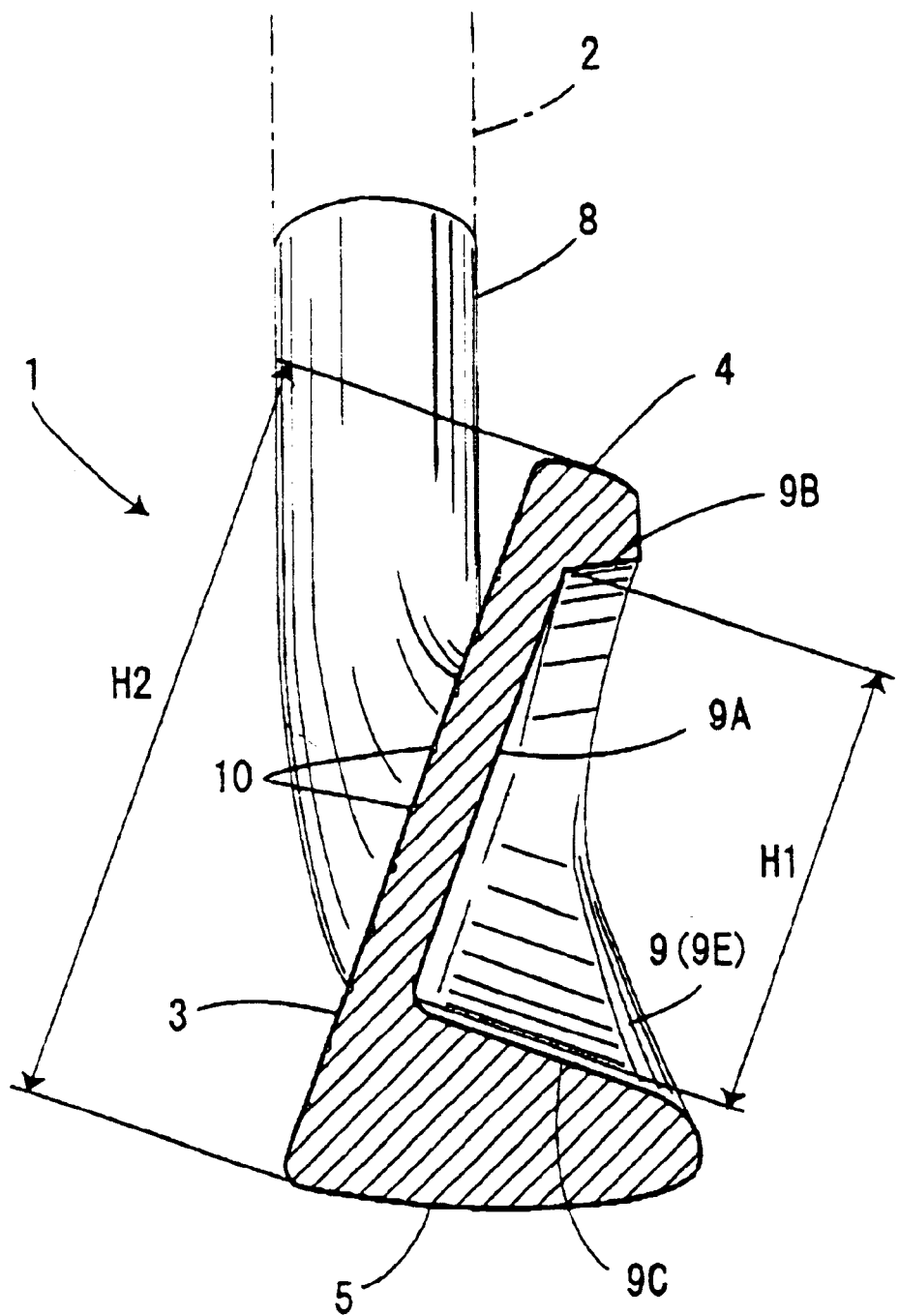
FIG. 3 is a section showing a first embodiment of the invention.

In FIGS. 1 to 3 showing an iron golf club of a first embodiment of the invention, the iron golf club comprises a forged iron head 1 and a shaft 2, said head 1 being made of nickel-beryllium alloy, stainless steel or the like, formed on a front with a face 3 for striking balls (not shown) while a top 4 at an upper part of the face 3, a sole 5 at a lower part thereof, a toe 6 at one side, and a heel 7 at the other side, are provided, respectively. From the heel 7 extends obliquely upwards a shaft attachment portion 8 or so-called hosel, to which is connected a lower end of the shaft 2.

Further, the rear surface of the head 1 is formed with a cavity 9, thus distributing the weight toward its periphery to thereby enlarge a moment of inertia. The cavity 9 is formed with a bottom surface 9A opposite to the face 3, an upper inner surface 9B at an upper side, a lower inner surface 9C at a lower side, a first inner side surface 9D at a first side and a second inner side surface 9E at a second side, respectively. Incidentally, reference numeral 10 designates grooves formed on the face 3, which are called score lines.

If the maximum height defined in the top-to-sole direction on the bottom surface 9A of the said cavity 9, namely, the maximum distance between the upper inner surface 9B and the lower inner surface 9C is denoted by H1, while the maximum length defined in the toe-to-heel direction on the surface 9A thereof, namely, the maximum distance between the first inner side surface 9D and the second inner side surface 9E is denoted by W1, then, the cavity 9 is formed so as to satisfy $H1/W1 \geq 0.6$. Preferably, this H1 to W1 ratio is indicated by an inequality: $0.6 \leq H1/W1 \leq 0.9$, more preferably by $0.65 \leq H1/W1 \leq 0.85$, in which all or a part of iron golf clubs may be formed to take substantially the same H1 to W1 ratio, or otherwise, they may be formed to take varying ratios depending on a club number, such as ratios which increase as the club number increases.

As follows are more specific H1/W1 ratios for each club number in accordance with the present embodiment of the invention, in which parenthesized values are those of conventional iron golf clubs:

3rd iron: 0.69 (0.56)

4th iron: 0.69 (0.56)

5th iron: 0.75 (0.56)

6th iron: 0.75 (0.56)

7th iron: 0.76 (0.56)

8th iron: 0.78 (0.59)

9th iron: 0.81 (0.39)

Further, If the maximum height of the face 3, namely, the maximum distance between the top 4 and the sole 5 is denoted by H2, then, the cavity 9 is formed so as to satisfy an inequality: $0.7 \leq H1/H2 \leq 0.85$. Preferably, this H1 to H2 ratio may be indicated by another inequality: $0.75 \leq H1/H2 \leq 0.85$, in which all or a part of iron golf clubs may be formed to take substantially the same H1 to H2 ratio, or otherwise, they may be formed to take varying ratios depending on a club number.

As follows are more specific H1/H2 ratios for each club number in accordance with the present embodiment of the invention, in which parenthesized values are those of conventional iron golf clubs:

3rd iron: 0.80 (0.69)

4th iron: 0.78 (0.69)

5th iron: 0.81 (0.68)

6th iron: 0.80 (0.67)

7th iron: 0.79 (0.65)

8th iron: 0.79 (0.65)

9th iron: 0.81 (0.64)

As is apparent from the foregoing, a golf club according to a first aspect of the embodiment of the invention comprises the head 1 having the face 3 on a front surface, the cavity 9 on a rear surface and the shaft attachment portion 8 on one side; and the shaft 2 connected to the shaft attachment portion 8, wherein said cavity 9 is formed to satisfy the inequality $H1/W1 \geq 0.6$, assuming that the maximum height defined in the top-to-sole direction on the bottom surface 9A of the cavity 9 is denoted by H1, while the maximum length defined in the toe-to-heel direction on the surface 9A thereof is denoted by W1.

Accordingly, due to the H1 to W1 ratios being larger than those of conventional iron golf clubs, the cavity 9 is widened toward the top-to-sole direction, so that the configuration of the bottom surface 9A of the cavity 9 becomes more like a square than those of conventional heads, thereby enabling the face 3 to be more easily warped or bent, so that a greater repulsive force is developed to elongate travelling distances of balls.

Further, according to a second aspect of the embodiment of the invention, the cavity 9 is formed to satisfy the inequality $0.7 \leq H1/H2 \leq 0.85$, assuming that the maximum height defined in the top-to-sole direction on the bottom surface 9A of the cavity 9 is denoted by H1, while the maximum height of the face 3 is denoted by H2, so that the H1 to H2 ratios are larger than those of conventional iron golf clubs. Accordingly, the cavity 9 is widened toward the top-to-sole direction, thereby enabling the face 3 to be more easily warped or bent, so that a greater repulsive force is developed to elongate travelling distances of balls. Specifically, if the H1/H2 ratios are less than 0.7, the above-described warping effect becomes too little, while if more than 0.85, the thickness becomes too small at the top 4 and the sole 5, thus causing a problem relating to the strength of the head.

Next, a second embodiment of the invention is described with reference to FIGS. 4 to 10, in which the same portions as those described in the foregoing embodiment are designated by the same reference numbers, and their repeated descriptions are omitted.

As shown in the drawings, the head 1 of this embodiment comprises: a head body 1A which is formed on a front with an aperture 11 opposite to the face 3 and is provided with the shaft attachment portion 8 connected to one side, said aperture 11 being communicating with the bottom surface 9A of the cavity 9; and a face plate 14 as a face member for securely fitting the same into the aperture 11. A periphery 12 of the aperture 11 defines a larger area than an area defined by the upper inner surface 9B, the lower inner surface 9C, the first side surface 9D and the second side surface 9E, having a stepped peripheral portion 13 along the same. The face plate 14 is fitted into the aperture 11 with a rear surface of the face plate 14 abutting to a bottom surface 15 of the stepped peripheral portion 13.

Further, an undercut portion 16 is formed near the face 3 on the inner lower surface 9C of the cavity 9. This undercut portion 16 is a recess formed by concaving the inner lower surface 9C toward the sole 5, extending from the first inner side surface 9D toward the second inner side surface 9E, in which its depth D, namely a distance D between the deepest portion of the undercut portion 16 and the inner lower surface 9C is 7 mm or above, preferably 10 mm or above.

Figure 4:
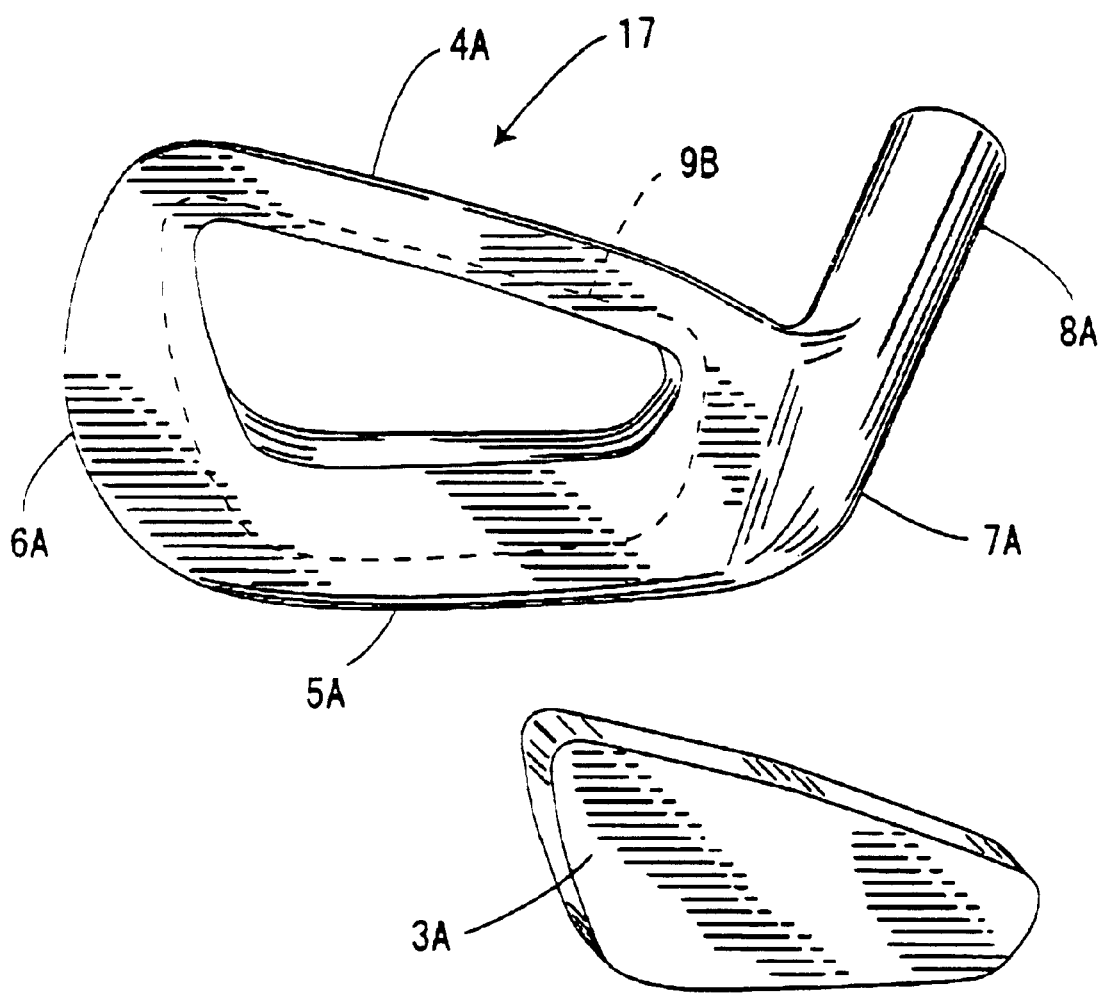
FIG. 4 is an exploded perspective view showing a prototype of a head in accordance with a second embodiment of the invention.
Figure 5:
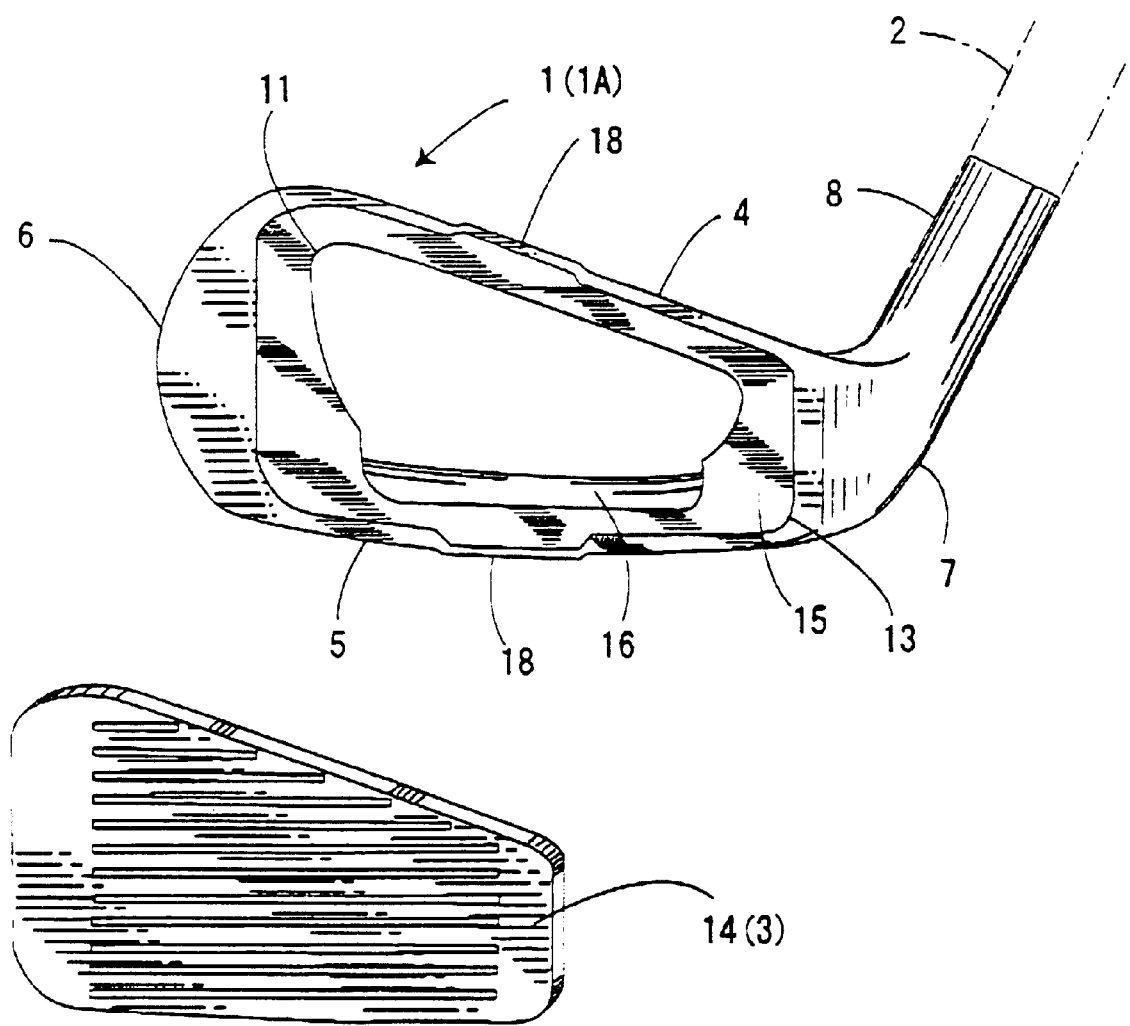
FIG. 5 is an exploded perspective view of the head of FIG. 4, seen from a front side.
Figure 6:
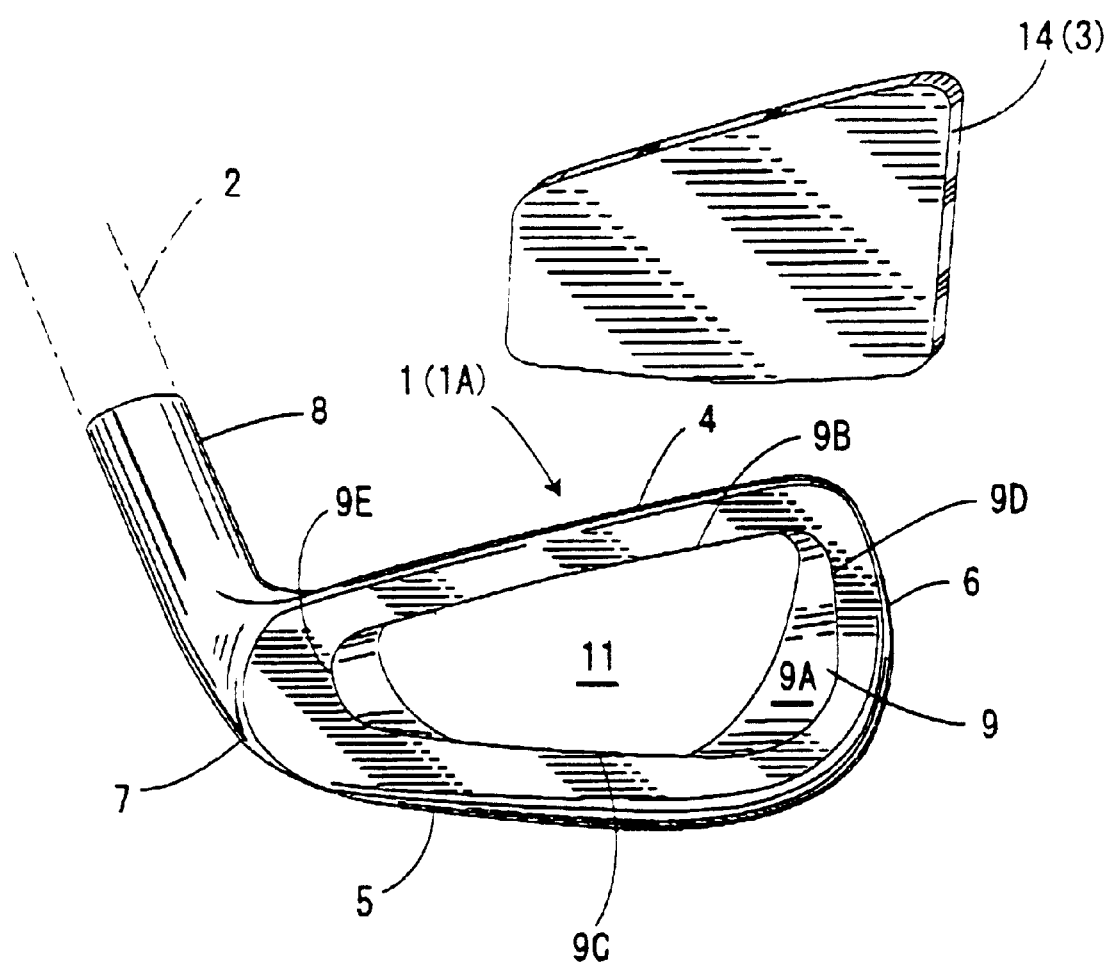
FIG. 6 is an exploded perspective view of the head of FIG. 4, seen from a rear side.
Figure 7:
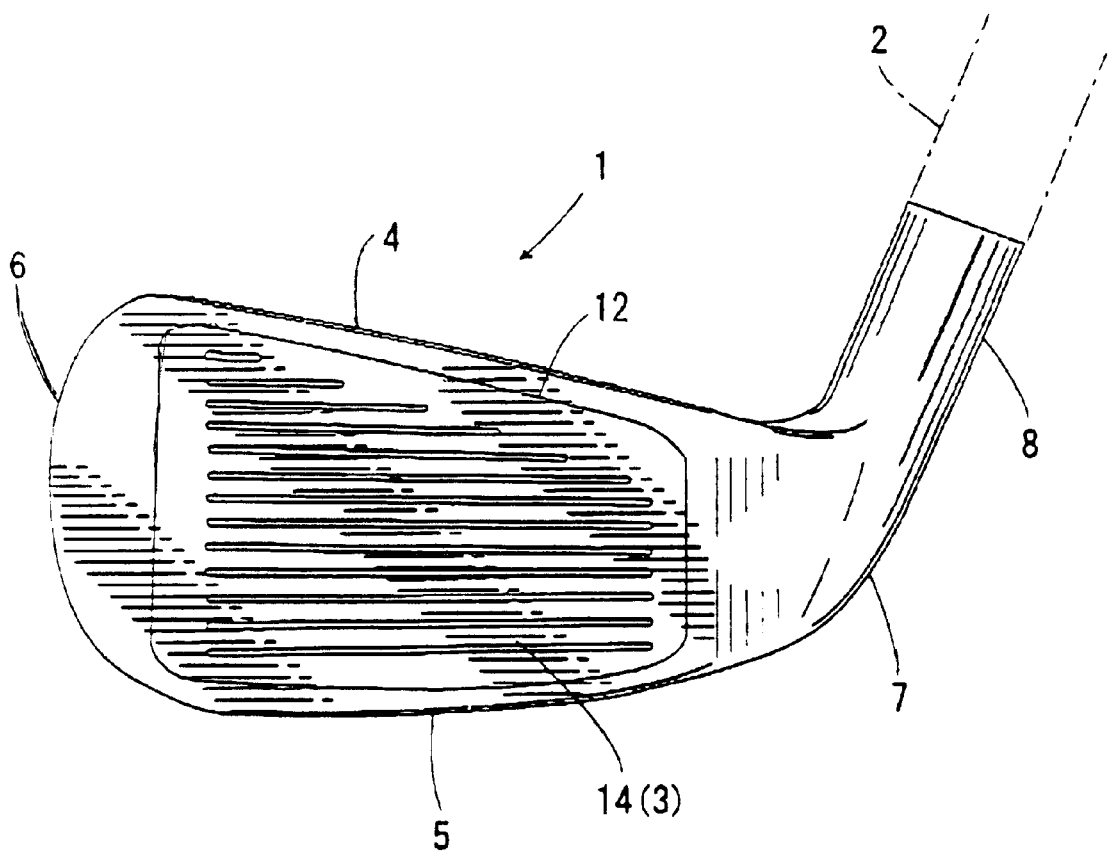
FIG. 7 is a front view showing a second embodiment of the invention.

Next, a manufacturing method is explained. As shown in FIG. 4, a metallic material such as nickel-beryllium alloy, stainless steel or soft iron is preliminarily formed into a head prototype 17, using a die (not shown). The head prototype 17 is formed with a prototypical face 3A, a prototypical top 4A, a prototypical sole 5A, a prototypical toe 6A, a prototypical heel 7A, a prototypical shaft attachment portion 8A and a prototypical cavity 9B, each corresponding to the aforesaid face 3, top 4, sole 5, toe 6, heel 7, shaft attachment portion 8 and cavity 9, respectively. Then, only the prototypical face 3A of the head prototype 17 is hollowed, while the head prototype 17 and the face 3A thereof is further processed by forging, rolling, machining, grinding and the like, to thereby form the head body 1A and the face plate 14.

Figure 8:
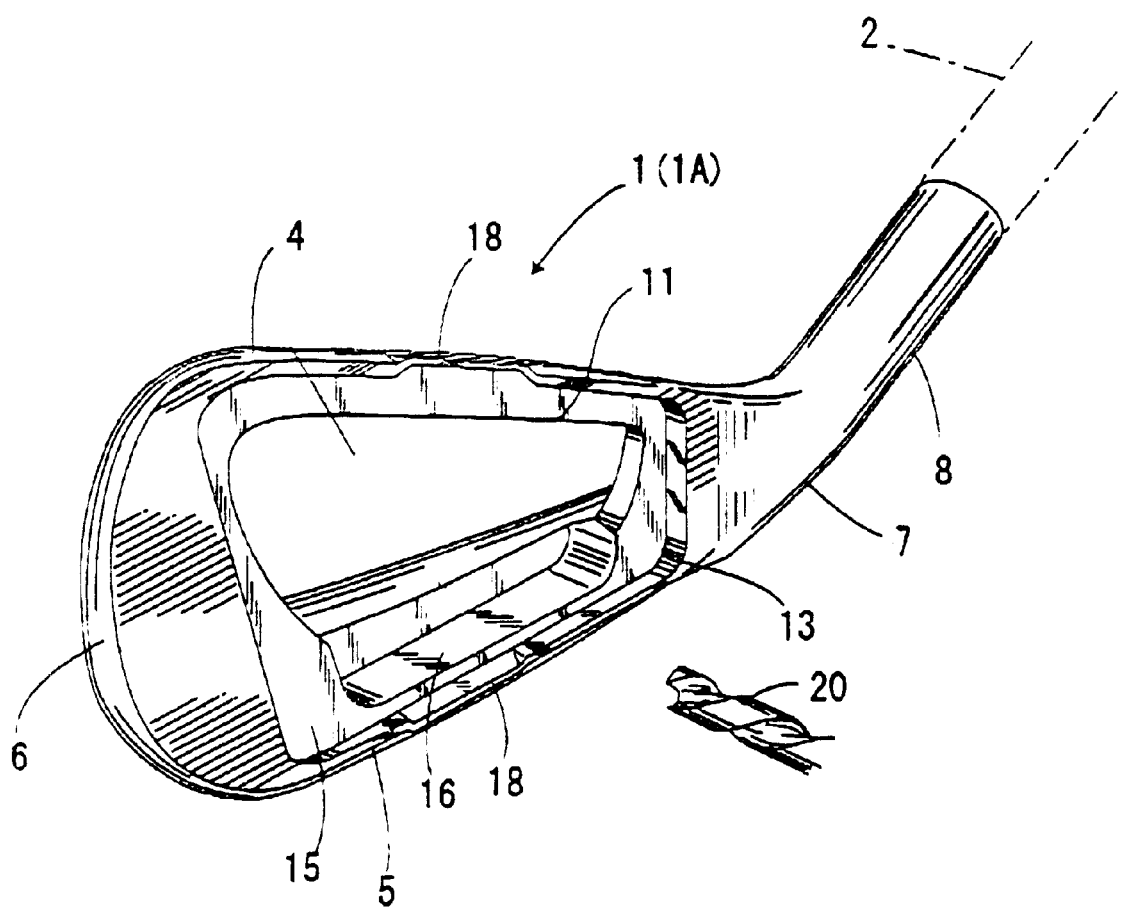
FIG. 8 is a perspective view showing a golf club which is under machining process in accordance with a second embodiment of the invention.
Figure 9:
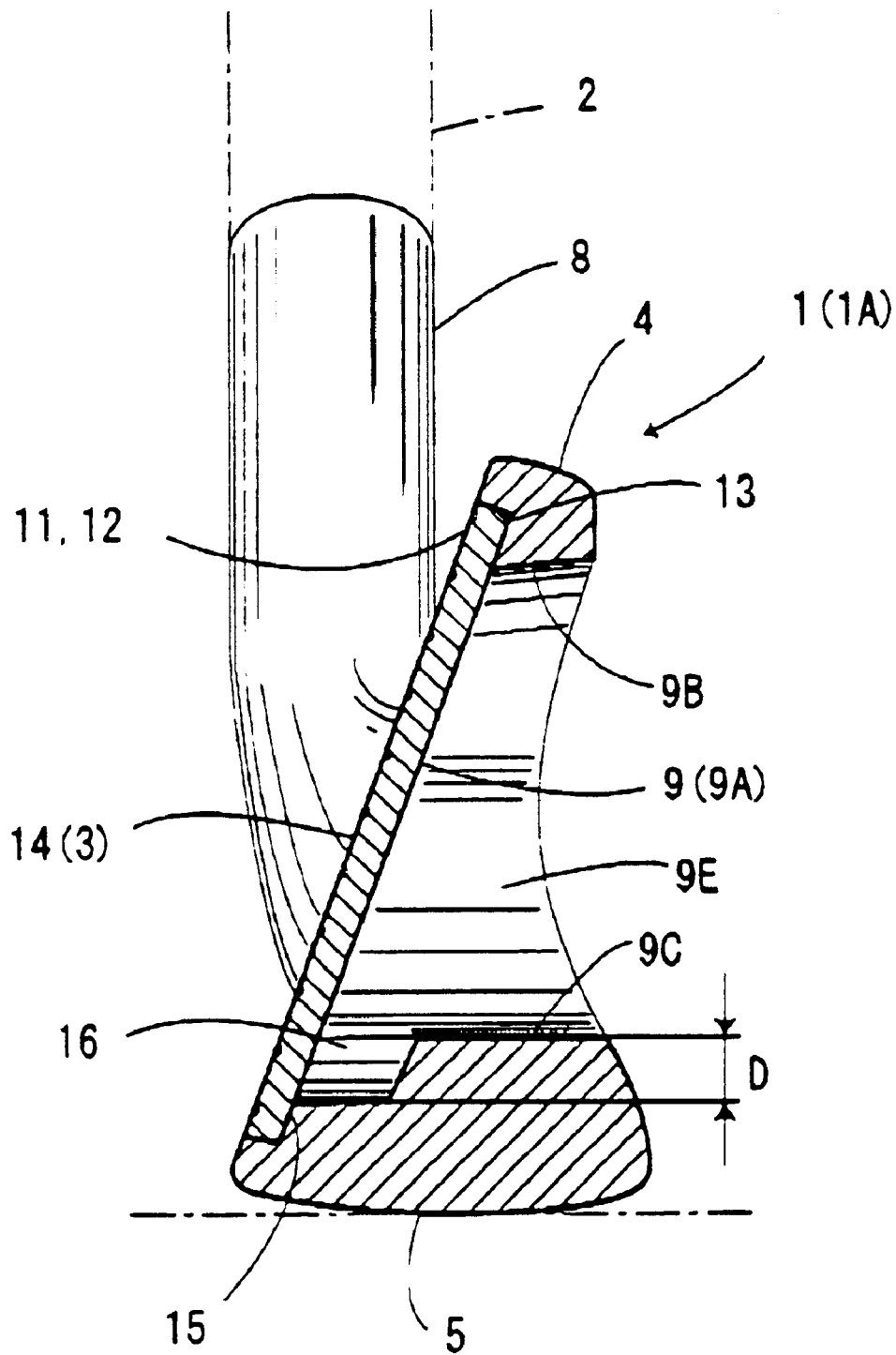
FIG. 9 is a section showing a second embodiment of the invention.

As shown in FIG. 8, the undercut portion 16 is formed on the head body 1A, at the same time that the cavity 9 and the aperture 11 are formed thereon. The undercut portion 16 is processed, using a certain mechanical processing unit 20 such as a machining tools or grinding tools including an endmill and a turning machine, in which the processing unit 20 is inserted into the aperture 11 from a front side, thereby machining or grinding the front side of the inner lower surface 9C.

Figure 10A:
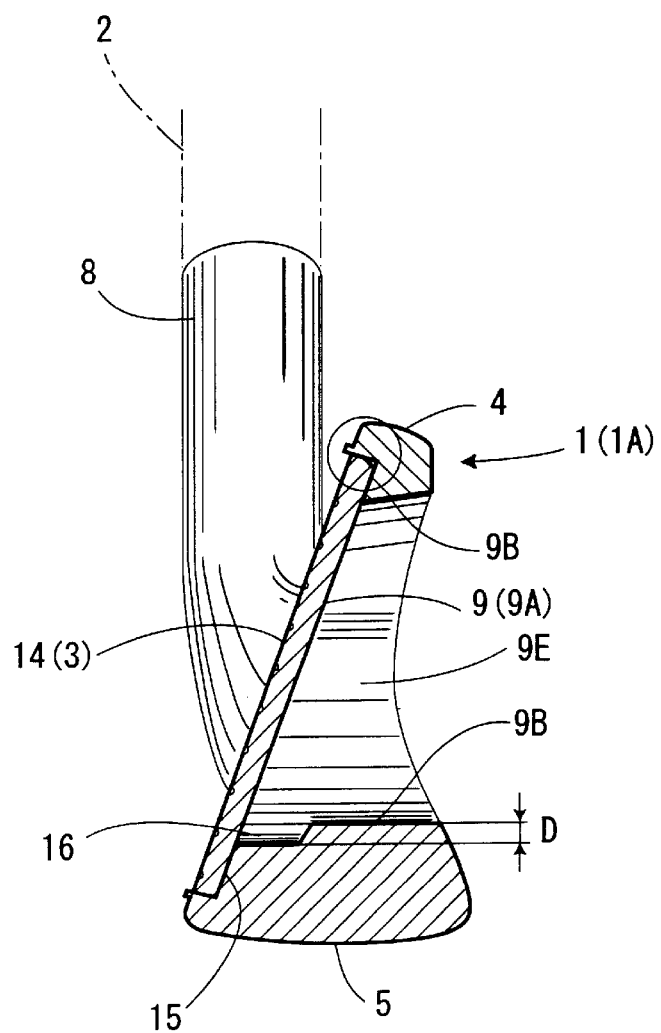
FIG. 10a is a section showing a golf club which is under welding process in accordance with a second embodiment of the invention, while FIG. 10b a partially enlarged section thereof.
Figure 10B:
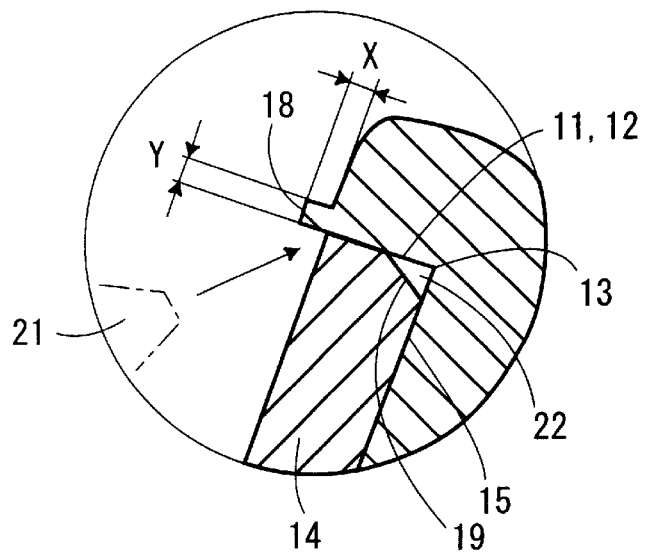

Further, the face plate 14 is secured to the head body 1A thus formed with the undercut portion 17, by means of laser beam welding. As illustrated in FIGS. 5, 6, 7, 10a and 10b, a small protrusion 18 is formed in advance along either an entire or a part of the peripheral portion 12 of the aperture 11. In a preferred form of the invention, the small protrusion 18 is formed in advance on the top side and the sole side only, as illustrated in FIGS. 10a and 10b. The small protrusion has a height of 1 mm or below, preferably about 0.8 mm, and a width of 1 mm or below, preferably 0.5 mm. On the other hand, the rear edge of the face plate 14 is formed in advance with a beveled portion 19 with an oblique line of about 0.5 to 1.5 mm length so that it may be inclined at a preset angle of elevation of 45 degrees or above, or at 80 degrees, for example.

After fitting the face plate 14 into the aperture 11, the laser beam welding is carried out by directing a head 21 of a laser welding machine toward the edge 12 of the aperture 11. At this time, the middle portion of the welded portion swells while the both ends thereof sink due to being attracted toward the middle portion by the welding heat, but the protrusion 18 also is fused, and thus the fused metal from the protrusion 18 is allowed to flow into the sinking portion, thereby preventing the welded portion from producing such sinking portion. Further, whilst the laser beam irradiation is carried out from a front side at the time of welding, a clearance 22 is formed between the face plate 14 and the bottom surface 15 by forming the aforesaid beveled portion 19 on the rear surface of the face plate 14, and thus, a relief space for bubbles generated during the laser beam welding is insured, said bubbles being able to escape through the relief space by means of the penetration welding relative to the partially thinned portion.

The aforesaid laser beam welding may be carried out at for example 450 W output, 250 mm/minute velocity, 30 pps pulse frequency, about 1.5 to 1.6 mm depth of penetration. In the meantime, the configuration and angle of the aforesaid beveled portion 19 may be modified as long as it serves to form a clearance 22.

As is apparent from the foregoing, a golf club according to the foregoing embodiment comprises the inner lower surface 9C of the cavity 9 formed with the undercut portion 16 defined toward the sole 5, corresponding to a third aspect of the invention. The deepest portion of the undercut portion 16 defines a depth D of 7 mm or above, thereby making the center of gravity deeper, enlarging a sweet area, so that there can be provided a golf club which enables golf balls to be more easily raised. Further, as the undercut portion 16 is disposed at the face 3 side on the inner lower surface 9C of the cavity 9, metal portions closer to the face 3 are removed, thereby enabling the bending of the face 3 in an effectively resilient manner.

Furthermore, according to a fourth aspect of the invention, there is provided a method for manufacturing a golf club, said golf club comprising: the face member 14; the head body 1A having the aperture 11 on a front for securing the face member 14 thereto, the cavity 9 formed on a rear face thereof and the shaft attachment portion 8 provided at one end thereof; and the shaft 2 connected to the head body 1A, said method comprising the steps of:

inserting the mechanical processing unit 20 from a front side of the head body 1A into the aperture 11, thus forming the inner lower surface 9C of the cavity 9 to the undercut configuration to thereby form the undercut portion 16; and then, securing the face member 14 to the aperture 11 by means of laser beam welding, whereby the mechanical processing unit 20 can be inserted deep into the aperture 11 without being disturbed by other portions when forming the undercut portion 16, and thus the degree of freedom with respect to machine processing can be enhanced and the undercut portion 16 can be formed deeper. As a result, the configuration and area of the face 3 are subjected to no restrictions associated with the forming of the undercut portion 16.

Moreover, according to a fifth aspect of the invention, there is provided a method for manufacturing a gold club, said method comprising the steps of:

forming the head prototype 17 by forging a raw material so that the head prototype 17 may comprise the prototypical face 3A and the prototypical cavity 9B;

hollowing the face 3A from the head prototype 17, then processing the hollowed face 3A to the face plate 14;

providing the aforesaid aperture 11 in the resultant hollow portion, while forming the undercut portion 16 in the aforesaid cavity 9B; and then, securing the face plate 14 to the aperture 11 by means of laser beam welding.

Thus, even though the head 1 is constructed of a single material, yet the mechanical processing unit 20 can be inserted deeply by hollowing the face 3A without being disturbed by other portions at the time of processing the undercut portion 16, thereby enhancing the degree of freedom with respect to machine so as to form the undercut portion 17 still deeper. As a result, the configuration and area of the face 3 are not restricted by the forming of the undercut portion 16.

Also, according to a further aspect of the invention, there is provided a method for manufacturing a golf club with one of the foregoing structures, in which the head body is formed by forging. Thus, so-called grain flows are formed by the forging so that metal tissues are made denser, thereby improving the strength of the golf club, also enabling the adjustment of loft angles and lie angles thereof.

Also, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face member 14, said method comprising the steps of:

forming the protrusion 18 on an entire or a part of the peripheral portion 12 of the member that is to be laser welded; and securing the face member 14 to the head body 1A by means of laser welding, whereby even though the welded portion sink due to being attracted by the welding, the fused metal from the protrusion 18 can fill such sinking portion, thereby enabling the preventing of the sinking portion. Specifically, with the protrusion 18 which has a height X of 1 mm or below, preferably about 0.8 mm, and a width Y of 1 mm or below, preferably 0.5 mm, the protrusion 18 thus can be fused without failures, free from the laser being out of focus. If the protrusion 18 is of a larger dimension than this, the laser is no longer in focus, and thus the protrusion 18 is unlikely to be fused sufficiently.

Still further, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face plate member 14, said method comprising the steps of:

forming the beveled portion 19 on the rear surface of the face plate member 14 that is to be laser welded; and securing the face plate member 14 to the head body 1A by means of laser welding, whereby the clearance 22 is formed between the face plate 14 and the bottom surface 15, and thus, a relief space for bubbles generated during the laser beam welding is insured, said bubbles being able to escape through the relief space without being confined within the welded portion, by means of the penetration welding relative to the resultant partially thinned portion. Consequently, as so-called pinholes are not formed on the welded portion, better welding can be performed. Moreover, as such pin holes do not appear on the welded part even after polishing, a golf club can be polished to a beautiful final product.

In the meantime, in the foregoing embodiments is illustrated the use of laser beam welding for securing the face member 14 to the head body 1A. The reason why the laser beam welding is preferred, is that as contrasted to TIG welding, the laser beam welding causes a less heat-affected zone, and thus it can be used for materials susceptible to heat as well, and that it causes less distortions, needs no welding rods so that it can be easily automated, and is capable of performing a better welding due to its V-shaped welding part. Further, as laser beam is an electromagnetic wave, it can propagate in the air without the attenuation of energy and the deterioration of optical characteristics, also without restrictions to working atmosphere, and furthermore, light-concentration and change of the direction can be carried out, using optical instruments such as lens and mirrors. Moreover, as it is not affected by the electromagnetic field, there are no restrictions to working jigs, while both metals and non-metals can be worked by the laser beam welding, without any X-ray radiation generated from a base material. In this respect, an electronic beam welding requires a vacuum surroundings in principle, and thus there are problems in respect of facilities and workability. As above mentioned, TIG welding causes such a large heat-affected zone that considerable distortions are resulted, and that it is too time-consuming due to manual operation, resulting in unstable bead lines. According to laser beam welding, however, welding can be automated through a welding automating programming, using a laser welding machine, and thus costs can be reduced as compared to TIG welding.

Figure 11:
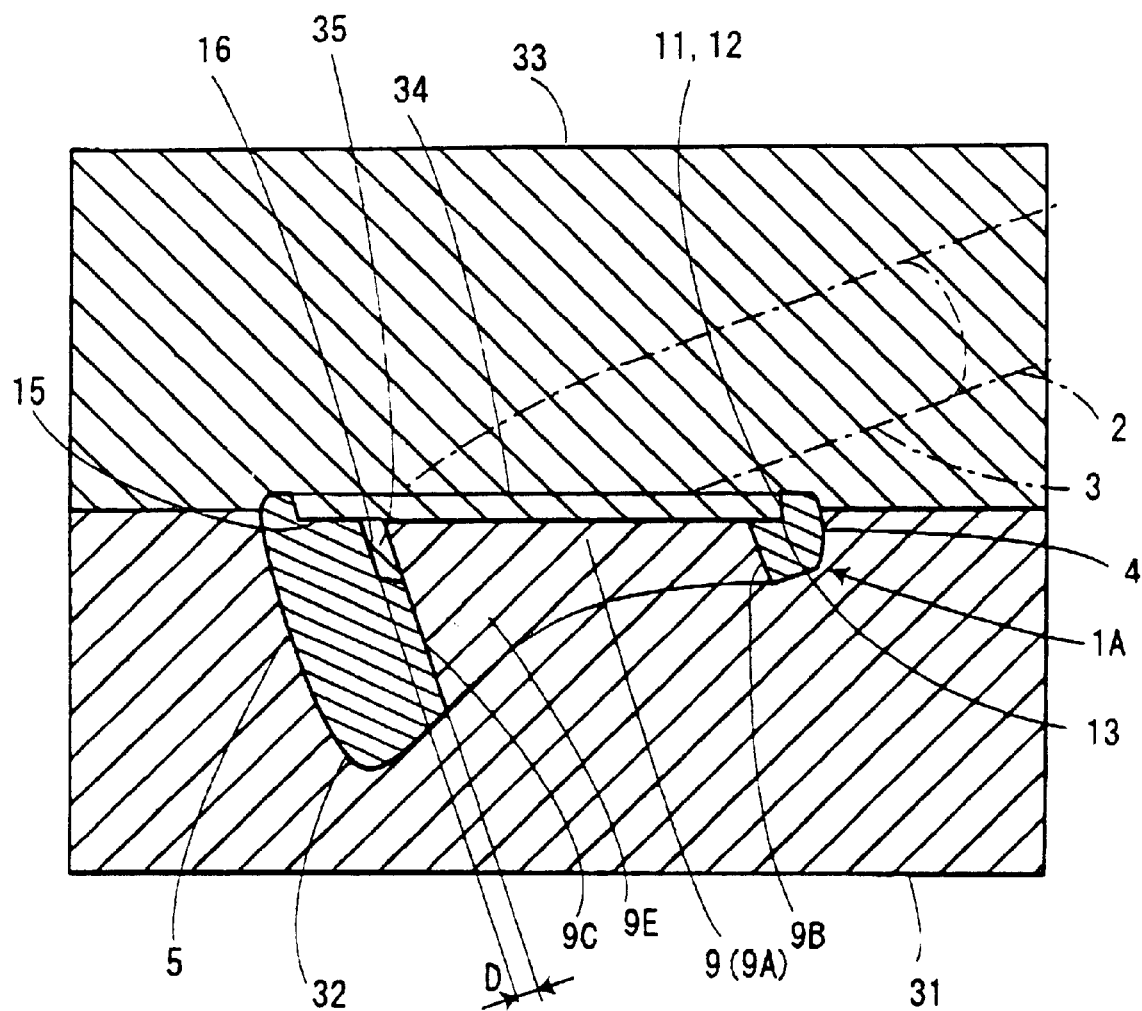
FIG. 11 is a section showing a third embodiment of the invention.

Next, a third embodiment of the invention is described with reference to FIG. 11, in which the same portions as those described in the foregoing embodiments are designated by the same reference numbers, and their repeated descriptions are omitted.

In this embodiment, the head body 1A preliminarily formed with the aperture 11 is formed by a cavity 32 of a first metallic mold 31 into which the head body 1A is accommodated. A second metallic mold 33 which mates with the first mold 31 is formed with a primary protrusion 34 for forming the aperture 11 and a secondary protrusion 35 for forming the undercut portion 16 by forging, said secondary protrusion 35 extending through the aperture 11. Thus, the head body 1A is accommodated into the cavity 32 of the first mold 31, which is mated with the second mold 33 and then pressure is applied thereto, whereby the aperture 11 is formed by the primary protrusion 34, at the same time that the undercut portion 16 can be formed by the secondary protrusion 35 which processes the inner lower surface 9C of the cavity 9.

As is apparent from the foregoing, the third embodiment provides a method for manufacturing a golf club according to a further aspect of the invention, in which the secondary protrusion 35 of the secondary mold 33 is allowed to extend from the aperture 11 of the head body 1A to thereby form the inner lower surface 9C of the cavity 9 to the undercut configuration, and then the face member 14 is secured to the aperture 11 by means of laser beam welding. Thus, the secondary protrusion 35 can be inserted deeply without being disturbed by other portions when processing the undercut portion 16, thereby enhancing the degree of freedom with respect to machine processing, enabling the undercut portion 16 to be formed deeper. Consequently, the configuration and area of the face 3 are not restricted by the forming of the undercut portion 16.

Next, fourth to sixth embodiments are explained with reference to FIGS. 12 to 14.

Figure 12A:
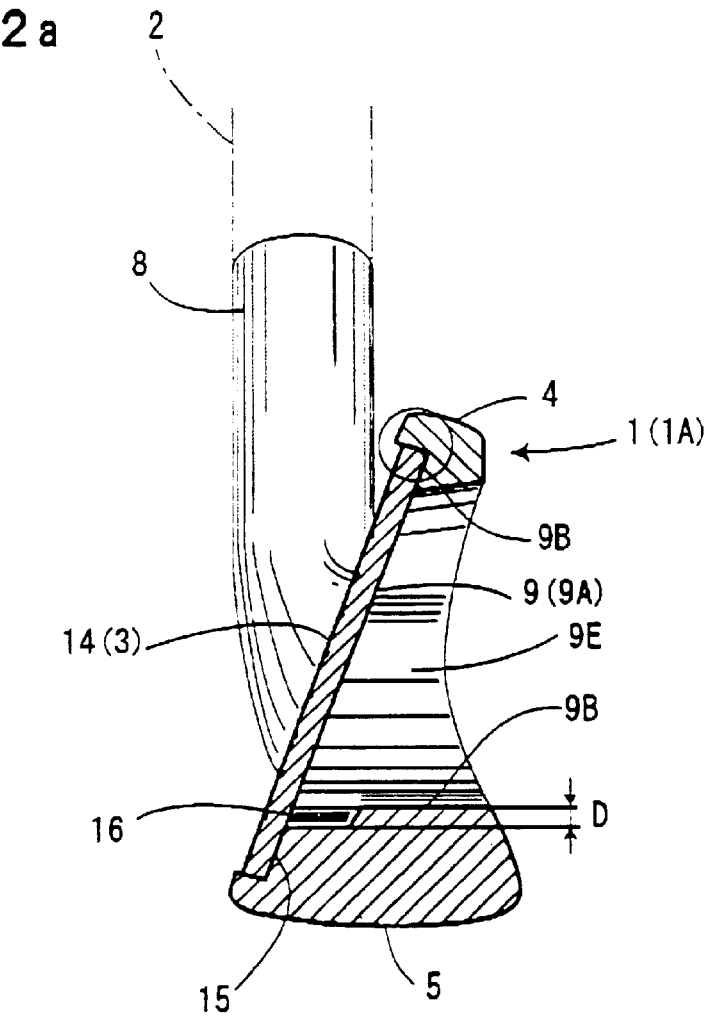
FIG. 12a is a section showing a fourth embodiment of the invention, while FIG. 12b a partially enlarged section thereof.
Figure 12B:
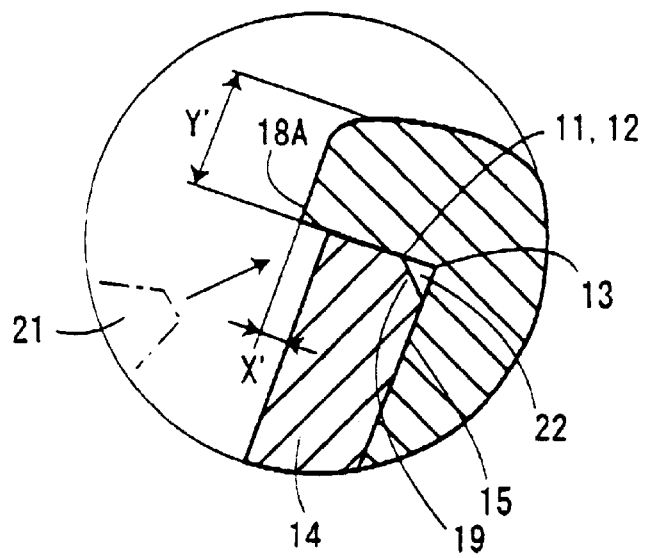

In a fourth embodiment as illustrated in FIGS. 12a and 12b, the face plate 14 is secured to the head body 1A which is formed with the said undercut portion 16, by means of laser beam welding. An entire or a part of the peripheral portion 12 of the aperture 11 is formed in advance with a protrusion 18A, said protrusion 18A being formed in this embodiment by making the head body 1A relatively thick at the top 4 and the sole 5 sides. Specifically, the protrusion 18A is so formed that it may protrude from the front surface of the face plate 14, being thickened from the upper part of the peripheral portion 12 to the top 4, and from the lower part thereof to the sole 5, respectively. The protrusion 18A has a height X' of 1 mm or below, preferably about 0.8 mm by which it protrudes from the front surface of the face plate 14, while it has a width Y defined from the peripheral portion 12 to the top 4 and the sole 5, as illustrated in FIG. 12b. The rear edge of the face plate 14 is formed in advance with the beveled portion 19 with an angle of elevation of 45 degrees or above, or 80 degrees, for example, having an oblique line being 0.5 to 1.5 mm long.

Then, the face plate 14 is fitted into the aperture 11, and thereafter, the laser beam welding is carried out by directing the head 21 of a laser welding machine to the edge 12 of the aperture 11. At that moment, the protrusion 18A also is melted, while the middle portion of the welded portion swells while the both ends thereof sink due to being attracted by heat. Nevertheless, the melted metal from the protrusion 18A is allowed to flow into the sinking portion, thereby preventing the producing of such sinking portion. Further, whilst laser beam irradiation is applied from the front surface in this welding process, as the clearance 22 is formed between the face plate 14 and the bottom surface 15 by forming the beveled portion 19, a relief space for bubbles generated during the welding to escape therethrough is insured, through the penetration welding relative to such partially thinned portion.

As is apparent from the foregoing, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face member 14, said method comprising the steps of:

forming the protrusion 18A on an entire or a part of the peripheral portion 12 of the head body 1A that is to be laser welded, said protrusion 18A protruding from the front surface of the face plate 13, having a thickness defined from the peripheral portion 12 to the top 4 and the sole 5,; and securing the face member 14 to the head body 1A by means of laser welding, whereby even though the welded portion sinks due to being attracted by the welding, the fused metal from the protrusion 18 can fill such sinking portion, thereby enabling the preventing of the sinking portion.

Figure 13A:
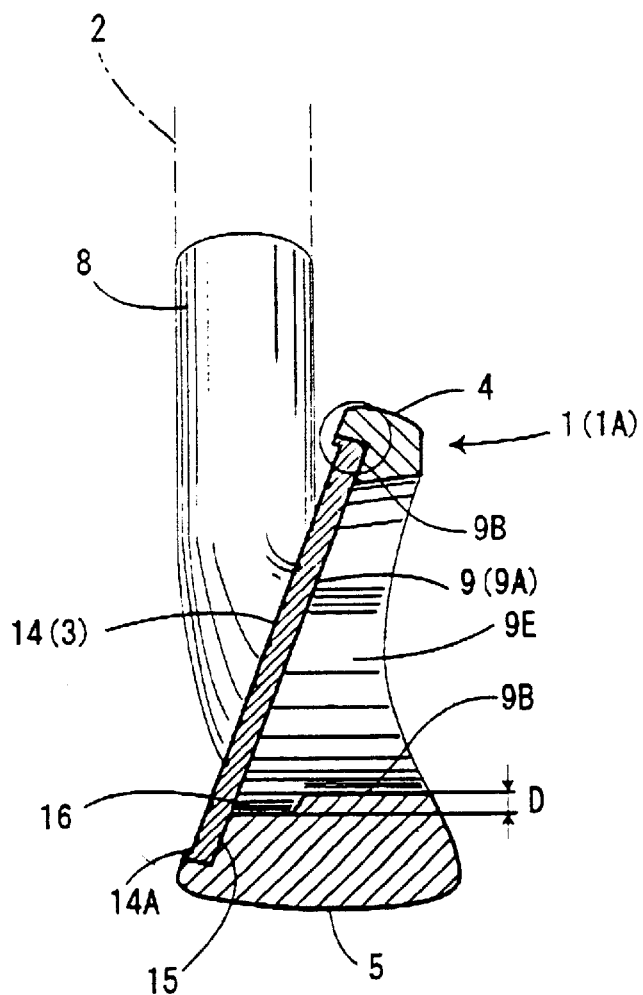
FIG. 13a is a section showing a fifth embodiment of the invention, while FIG. 13b a partially enlarged section thereof.
Figure 13B:
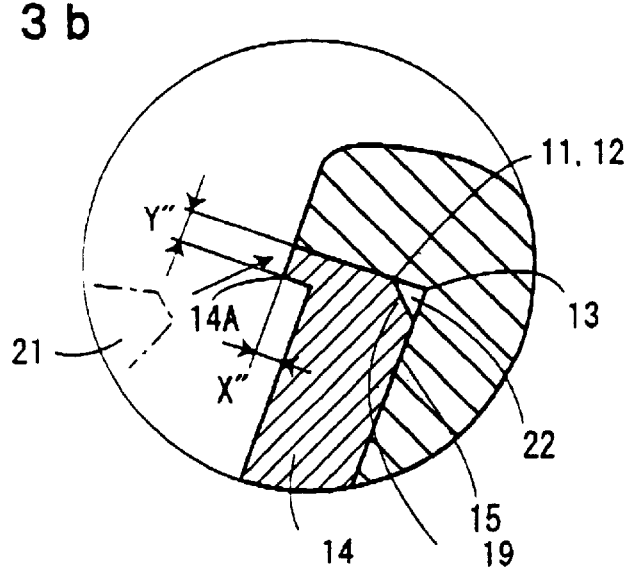

Likewise, in FIGS. 13a and 13b, showing a fifth embodiment of the invention, the face plate 14 is secured to the head body 1A which is formed with the said undercut portion 16, by means of laser beam welding. Specifically, an entire or a part of the peripheral portion of the face plate 14 is formed in advance with a protrusion 14A, said protrusion 14A being formed in this embodiment by making the thickness of the face plate 14 greater at the top 4 and the sole 5 sides. The protrusion 14A is so formed that it may protrude from the central front face of the face plate 14. The protrusion 14A has a height X" of 1 mm or below, preferably about 0.8 mm by which it protrudes from the central front surface of the face plate 14, while it has a width Y" of 1 mm or below, preferably about 0.5 mm, thereby ensuring the welding of the protrusion 14A without a likelihood of laser beam being out of focus. On the other hand, the rear edge of the face plate 14 is formed in advance with the beveled portion 19 with a preset angle of elevation of 45 degrees or above or 80 degrees, for example, having an oblique line being 0.5 to 1.5 mm long.

Then, the face plate 14 is fitted into the aperture 11, and thereafter, the laser beam welding is carried out by directing the head 21 of a laser welding machine to the edge 12 of the aperture 11. At that moment, the protrusion 14A also is melted, while the middle portion of the welded portion swells and the both ends thereof sink due to being attracted by heat. Nevertheless, the melted metal from the protrusion 14A is allowed to flow into the sinking portion, thereby preventing the producing of such sinking portion. Further, whilst laser beam irradiation is applied from the front surface in this welding process, as the clearance 22 is formed between the face plate 14 and the bottom surface 15 by forming the beveled portion 19, a relief space for bubbles generated during the welding to escape therethrough is insured, through the penetration welding relative to such partially thinned portion.

As is apparent from the foregoing, according to a further aspect of the invention, there is provided a method for manufacturing a golf club, said golf club comprising: the head 1 having the face 3 on a front and the shaft attachment portion 8 provided at one side; and the shaft 2 connected to the head 1, said head 1 being formed by combining a plurality of members such as the head body 1A and the face plate 14, said method comprising the steps of:

forming the protrusion 14A on an entire or a part of the peripheral portion of the face plate 14 that is to be laser welded, said protrusion 14A protruding from the central front surface of the face plate 14; and securing the face plate 14 to the head body 1A by means of laser welding, whereby even though the welded portion sinks due to being attracted by the welding, the fused metal from the protrusion 14A can fill such sinking portion, thereby enabling the preventing of the sinking portion.

Figure 14A:
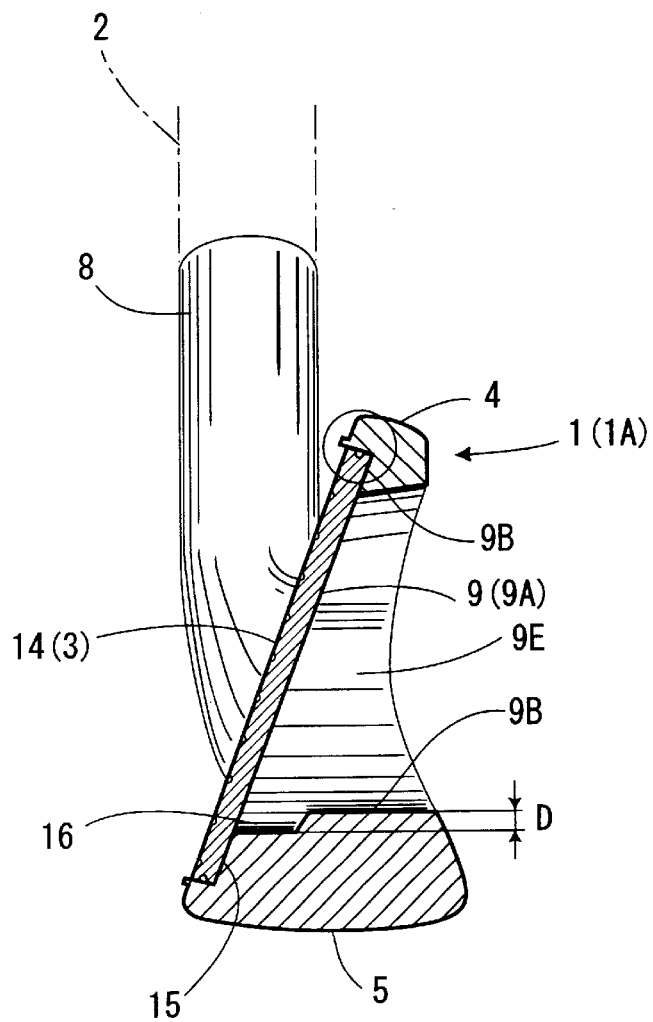
FIG. 14a is a section showing a sixth embodiment of the invention, while FIG. 14b a partially enlarged section thereof.
Figure 14B:
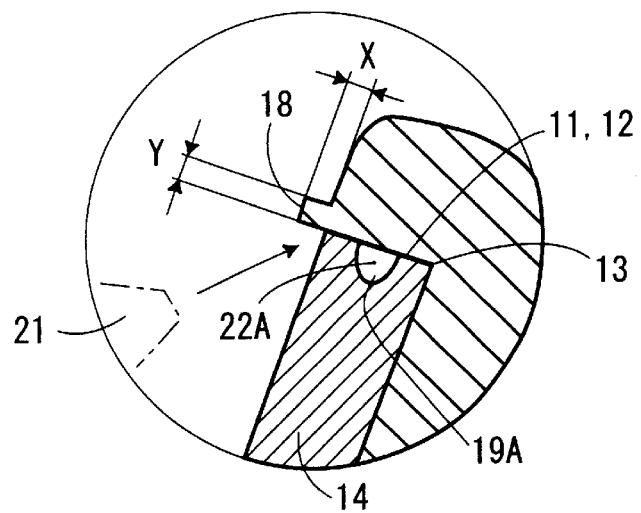

In FIGS. 14a and 14b showing a sixth embodiment of the invention, the side faces of the face plate 14 are formed in advance with a recess 19A. Then, the face plate 14 is fitted into the aperture 11, and thereafter, the laser beam welding is carried out by directing the head 21 of a laser welding machine to the edge 12 of the aperture 11. Whilst the laser beam irradiation is applied from the front side, as a clearance 22A is formed between the face plate 14 and the aperture 11 by forming the recess 19A on the side faces of the face plate 14, a relief space for bubbles generated during the welding to escape therethrough is insured, through the penetration welding relative to the partially thinned portion. It should be noted that the recess 19A may be shaped in various manners, as long as it serves to form the clearance 22A.

As is apparent from the foregoing, in the sixth embodiment of the invention, there is provided a method for manufacturing a golf club, said golf club having the head 1 formed by combining a plurality of members such as the head body 1A and the face plate 14, said method comprising the steps of:

forming the recess 19A on the side faces of the face plate 14 that is to be laser welded; and securing the face plate 14 to the head body 1A by means of laser welding, whereby the clearance 22A is formed between the face plate 14 and the head body 1A, and thus, a relief space for bubbles generated during the laser beam welding is insured, said bubbles being able to escape through the relief space without being confined within the welded portion, by means of the penetration welding relative to the resultant partially thinned portion. As a result, pin holes are not formed on the welded portion, which thus attains a better welding, and a golf club can be polished to a final product with a beautiful appearance, which is free from pin holes resulting from the confined bubbles.

Incidentally, the present invention should not be limited to the foregoing embodiments, but may be variously modified within a scope of the invention.

Figure 15:
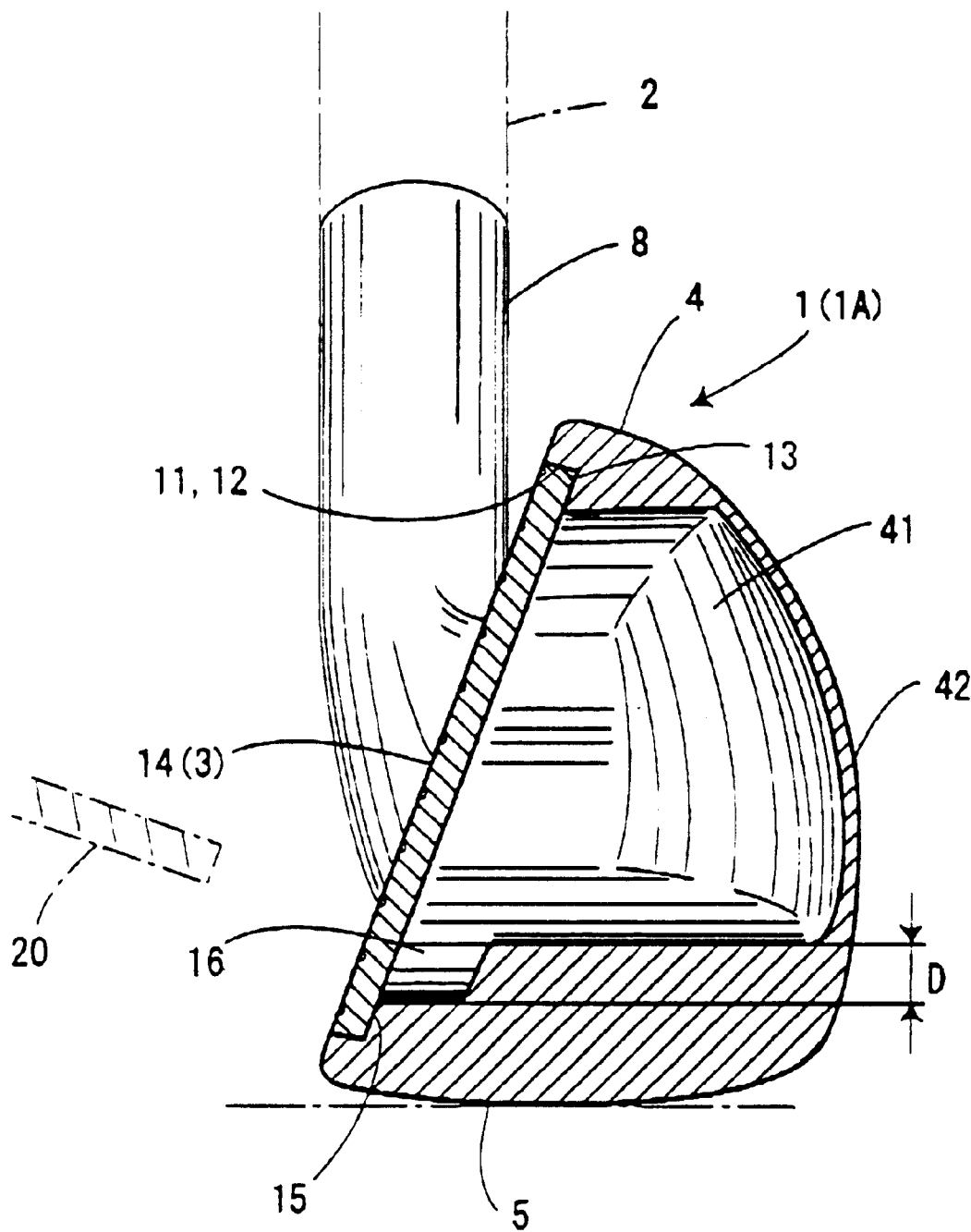
FIG. 15 is a section showing a sixth embodiment of the invention

For example, as illustrated in FIG. 15, the present invention may apply to a so-called hollow-type iron golf club in which a rear shell 42 is formed integrally with the rear surface of the head body 1A with an hollow interior 41 defined therebetween. In the case of such hollow-type iron golf club, there can be provided a method for manufacturing a golf club according to a fourth aspect of the invention, said golf club comprising: the face member 14; the head body 1A having the aperture 11 on a front for securing the face member 14 thereto, the hollow interior 41 on a rear and the shaft attachment portion 8 provided on one side; and the shaft 2 connected to the head body 1A, said method comprises the steps of:

inserting the mechanical processing unit 20 from the front side of the head body 1A through the aperture 11 to form the hollow interior 41 which makes up a part of the head body 1A; and then, securing the face member 14 to the aperture 11 by means of laser beam welding.

Thus, the machine processing unit 20 can be inserted deeply without being disturbed by other portions when processing the hollow interior 41, thus enhancing the degree of freedom with respect to machine processing, enabling the hollow interior to be formed deeper.

Figure 16:
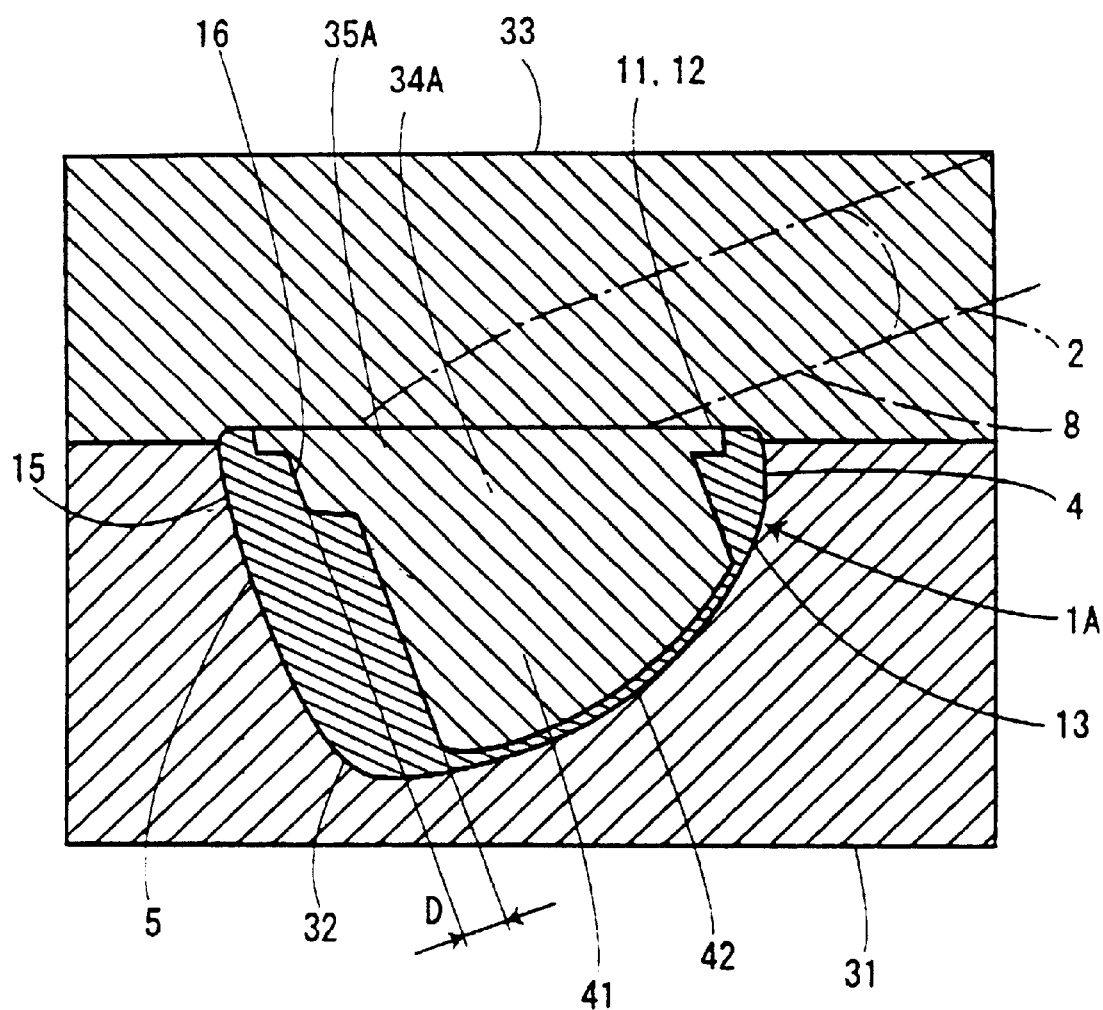
FIG. 16 is a section showing a seventh embodiment of the invention

Further, for another hollow-type iron golf club as illustrated in FIG. 16, there can be provided a method for manufacturing a golf club according to a sixth aspect of the invention, said method comprises the steps of:

inserting a secondary protrusion 34A and primary protrusion 35A of the secondary mold 33 from the aperture 11 side of the head body 1A through the aperture 11 to thereby form the hollow interior 41 and the undercut portion 16; and then, securing the face member to the aperture 11 by means of laser beam welding.

Thus, the secondary protrusion 35A can be inserted deeply without being disturbed by other portions when processing the hollow interior 41, thus enhancing the degree of freedom with respect to machine processing, enabling it to be formed deeper.

Alternatively, the use of other welding means such as TIG welding should not be excluded from the scope of the invention. Further, other securing means than welding, such as bonding and press-fitting may be employed.

What is claimed:

1. An iron golf club which comprises:

a head which has a face on a front surface, a shaft attachment portion at one side and a cavity on a rear surface, said cavity having a bottom surface opposite to said face, defined by a maximum length H1 in a top-to-sole direction and another maximum length W1 in a toe-to-heel direction; and a shaft connected to the head, wherein the cavity is formed to satisfy an inequality: $0.65 \leq H1/W1 \leq 0.85$, and wherein an inner lower surface of said cavity is formed with an undercut configuration defined toward a sole, said undercut having a maximum depth of 10 mm or above.

2. An iron golf club which comprises:

a head which has a face on a front surface, said face having a maximum length H2 in a top-to-sole direction, a shaft attachment portion at one side and a cavity on a rear surface, said cavity having a bottom surface opposite to said face, defined by a maximum length H1 in a top-to-sole direction; and a shaft connected to the head, wherein the cavity is formed to satisfy an inequality: $0.75 \leq H1/H2 \leq 0.85$, and wherein an inner lower surface of said cavity is formed with an undercut configuration defined toward a sole, said undercut having a maximum depth of 10 mm or above.

3. An iron golf club according to claim 1, wherein said golf club head comprises a face member with a beveled portion formed at a rear edge thereof and a head body having an aperture on a front surface for securing the face member thereto, said aperture being formed with a protrusion along a peripheral portion thereof, and wherein a mechanical processing unit is inserted from a front side of said head body through the aperture to process said head body, and then, the face member is secured to the aperture by means of laser beam welding.

4. An iron golf club according to claim 1, wherein said golf club head comprises: a face member with a beveled portion formed at a rear edge thereof; a head body having an aperture on a front surface for securing the face member thereto, said aperture being formed with a protrusion along a peripheral portion thereof, and wherein a raw material is forged to form a head prototype so that the head prototype may have a face corresponding portion and a cavity corresponding portion, then the face corresponding portion is hollowed from the head prototype to provide a separate face corresponding portion and a resultant hollow portion, said separate face corresponding portion being processed to said face member, while the resultant hollow portion is formed into said aperture, then an undercut portion is formed on said cavity corresponding portion to thereby form said cavity; and then, said face member is secured to the aperture by means of laser beam welding.

5. An iron golf club according to claim 1, wherein said golf club head club comprises: a face member with a beveled portion formed at a rear edge thereof; a head body having an aperture on a front surface for securing the face member thereto, said aperture being formed with a protrusion along a peripheral portion thereof, wherein a die is inserted from a front side of said head body through the aperture to process the said head body; and the face member is secured to the aperture by means of laser beam welding.

* * * * *